(12) United States Patent
Bedi et al.

(10) Patent No.: US 7,991,794 B2
(45) Date of Patent: Aug. 2, 2011

(54) PIPELINING OPERATIONS INVOLVING DML AND QUERY

(75) Inventors: Harmeek Singh Bedi, Redwood Shores, CA (US); Richard Yu Gu, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 12/190,413

(22) Filed: Aug. 12, 2008

(65) Prior Publication Data

US 2009/0157623 A1 Jun. 18, 2009

(51) Int. Cl.
G06F 7/00 (2006.01)
G06F 17/30 (2006.01)

(52) U.S. Cl. .................. 707/796; 707/803; 707/809

(58) Field of Classification Search .................. 707/796
See application file for complete search history.

(56) References Cited

U.S. PATENT DOCUMENTS

| | | | |
|---|---|---|---|
| 5,619,713 A | 4/1997 | Baum et al. | |
| 5,832,475 A | 11/1998 | Agrawal et al. | |
| 5,832,498 A * | 11/1998 | Exertier .............................. | 1/1 |
| 5,903,887 A | 5/1999 | Kleewein et al. | |
| 6,092,082 A | 7/2000 | Maruyama | |
| 6,167,405 A | 12/2000 | Rosensteel et al. | |
| 6,169,794 B1 | 1/2001 | Oshimi et al. | |
| 6,282,533 B1 | 8/2001 | Ramaswamy et al. | |
| 6,341,281 B1 | 1/2002 | MacNicol et al. | |
| 6,356,891 B1 | 3/2002 | Agrawal et al. | |
| 6,493,727 B1 | 12/2002 | Huang et al. | |
| 6,684,215 B1 | 1/2004 | Saracco | |
| 6,721,742 B1 | 4/2004 | Uceda-Sosa et al. | |
| 6,772,165 B2 | 8/2004 | O'Carroll | |
| 6,879,984 B2 | 4/2005 | Duddleson et al. | |
| 6,895,471 B1 | 5/2005 | Tse et al. | |
| 6,917,933 B2 | 7/2005 | Craig et al. | |
| 7,062,481 B2 | 6/2006 | Pham et al. | |
| 7,469,256 B1 * | 12/2008 | Manolov et al. ...................... | 1/1 |
| 2002/0059299 A1 | 5/2002 | Spaey | |
| 2003/0061244 A1 | 3/2003 | Hirohata | |

(Continued)

OTHER PUBLICATIONS

Barclay et al., "Loading Databases Using Dataflow Parallelism", 1994, 16 pages.

(Continued)

*Primary Examiner* — Don Wong
*Assistant Examiner* — Binh V Ho
(74) *Attorney, Agent, or Firm* — Hickman Palermo Truong & Becker LLP

(57) ABSTRACT

Techniques are described herein for supporting pipelining operations involving DML (Data manipulation Language) and query. In an embodiment, a DML operation is performed for the purpose of changing data in a database system from a first state to a second state. Before the data in the database system is changed by the DML operation, the DML operation has an in-memory representation of such data. In an embodiment, a subsequent query operation that logically depends on the data in the database system in the second state is granted access to the in-memory representation of such data in the second state before the data in the database system is changed by the DML operation to the second state. As a result, operations may be executed in a pipelined fashion with minimum blocking.

20 Claims, 4 Drawing Sheets

U.S. PATENT DOCUMENTS

2003/0065477 A1    4/2003   Opdyke
2004/0148308 A1*   7/2004   Rajan et al. ................... 707/102
2004/0199535 A1    10/2004  Zuk
2004/0249870 A1*   12/2004  Jeevanjee et al. ............. 707/204
2005/0076046 A1    4/2005   Goldsack
2005/0154696 A1*   7/2005   Gutsche ............................ 707/1

OTHER PUBLICATIONS

Lehner et al., "Fast Refresh Using Mass Query Optimization", 2001 IEEE, IBM, 8 pages.

Wilkinson et al., "Parallel Programming", Prentice Hall, 1999, 20 pages.

* cited by examiner

PIPELINING OPERATIONS INVOLVING DML AND QUERY

CROSS REFERENCE

This application is related to U.S. patent application Ser. No. 10/447,862, entitled "METHOD AND APPARATUS FOR PERFORMING MULTI-TABLE MERGE OPERATIONS IN A DATABASE ENVIRONMENT", the contents of all of which are incorporated by this reference in their entirety for all purposes as if fully set forth herein.

FIELD OF THE INVENTION

The present invention relates to databases and, more specifically, databases that support pipelining operations involving DML and query.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a database system that supports both on-line transaction processing (OLTP) and on-line analytical processing (OLAP), some tables, known as "fact" tables, are set aside to store fact data, while some other tables, known as "dimension" tables, are set aside to store dimension data. The dimension data classifies values stored in the fact tables.

To load data that is generated in a large number of on-line transactions into the fact tables and dimension tables, many different types of data operations are involved. For example, database operations that generate new records may be represented by an insert type of database operation. Database operations that update existing records may be represented by an update type of database operation. Database operations that either update existing records or insert new records depending on a target table's data content may be represented by a merge type of database operation. Database operations that delete existing records may be represented by a delete type of database operation.

Under traditional approaches, data operations are represented by distinct SQL statements that must be executed sequentially. Thus, data manipulation operation in dimension tables may be performed first; a related data manipulation operation in a fact table may be performed next. Later operations, whether manipulation, query, or aggregation operations, may require retrieving keys such as surrogate keys from the dimension tables on which the earlier data manipulation operations have acted. Even though these earlier and later operations share common information such as surrogate keys, the operations involved all require their independent data accesses to the same dimension tables. Thus, a disadvantage of these traditional techniques is that they require large number of repeated related data accesses to same data objects.

Therefore, a better approach, which would better support efficient data accesses, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for supporting pipelining operations involving DML (Data Manipulation Language) and query. According to the techniques described herein, a first operation, which is a data manipulation operation in a series of operations, is performed for the purpose of changing data in database structures in a database system from a first state to a second state. This first operation may comprise a number of subtasks. At a certain point before the data in the database structures in the database system is changed by the first operation, the first operation has an in-memory representation of such data. According to an embodiment of the present invention, a second operation, which is a query operation in the series of operations and logically depends on the data in the one or more database structures in the database system in the second state, is granted access to the in-memory representation of the data in the one or more database structures in the database system in the second state prior to a first time when the data in the one or more database structures in the database system is changed by the first operation to the second state. Here, each of the data structures in the database system may be a relational data structure. In addition, each operation in the series of operations has a one-to-one correspondence with each relational database statement in a series of relational database statements, and results of the series of operations can be alternatively obtained by executing the series of relational database statements.

Since the second operation can access the in-memory representation of the data in the data structures before the data in the data structures (actually) reaches the second state, even though the second operation logically depends on such data in the second state, the second operation does not have to wait for the first operation to complete and can proceed forward with the in-memory representation of the data. Similarly, other operations may also proceed by accessing in-memory representation of the data in the data structures in various states without waiting for the data structures to actually contain the data in such various states, even though these other operations may logically depend on the data in the various states. As a result, operations may be executed in a pipelined fashion with minimum blocking.

System Description

Figure 1:
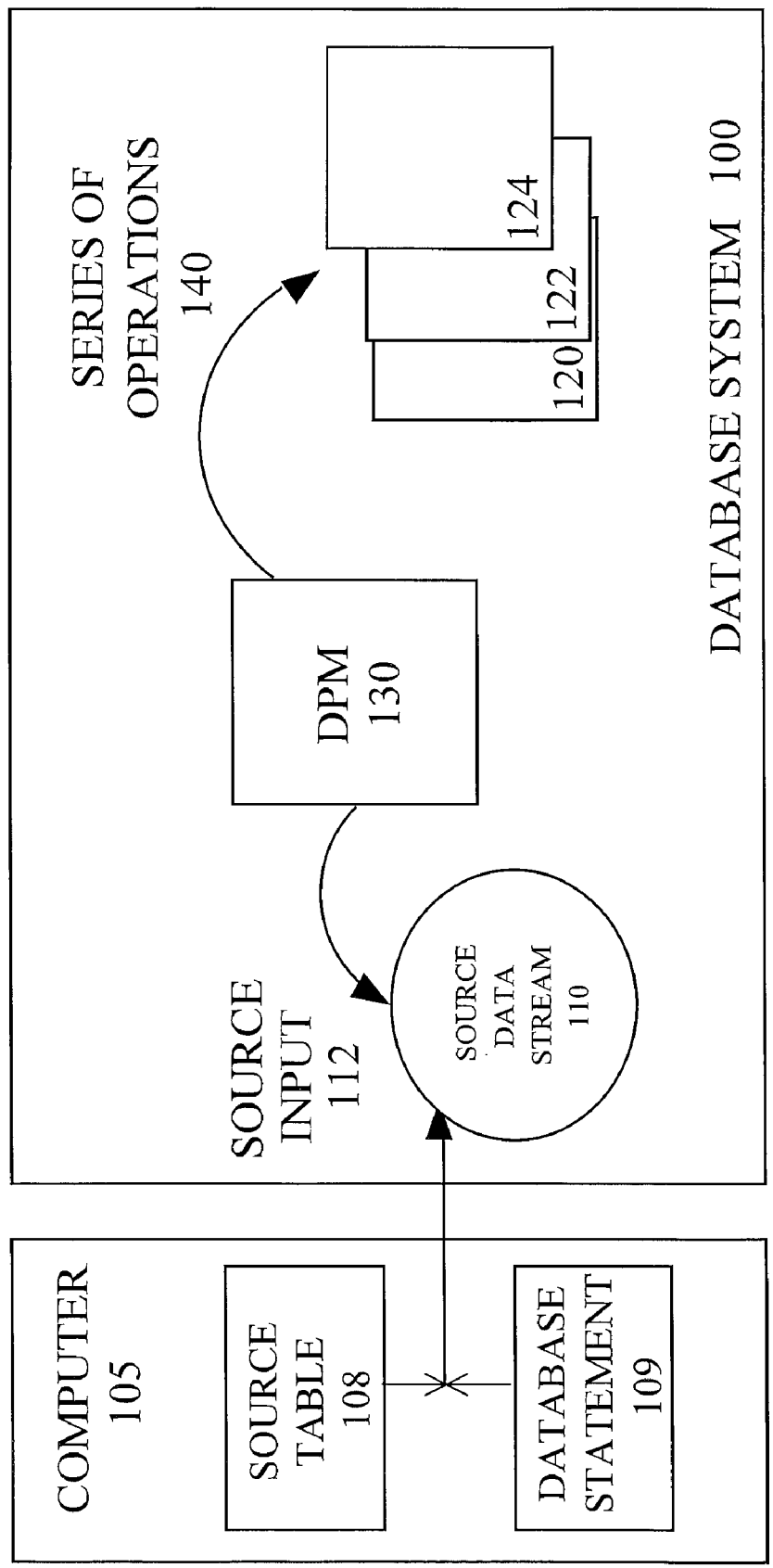
FIG. 1 is a block diagram that illustrates example entities in an example embodiment.

FIG. 1 illustrates a database system configured according to an embodiment. A database system 100 such as shown by FIG. 1 may correspond to systems, which communicate with numerous external data sources to manipulate, query, and aggregate data at a centralized source. An example of such a system is ORACLE WAREHOUSE BUILDER, manufactured by ORACLE CORP.

In an embodiment, database system 100 includes a DML pipelining mechanism (DPM) 130. The DPM 130 illustrates components and resources of the database system 100 which are used to receive external data from external sources and, at least in part based on the external data, to manipulate, query, and aggregate data in internal data structures of the database system. In an embodiment, the internal data structures managed by the DPM 130 are in the form of tables. In an example provided by FIG. 1, the internal data structures include a first internal table 120, a second internal table 122, and a third internal table 124. In an example embodiment, the first internal table 120 and the second internal table 122 may be dimensional tables, while the third internal table may be a fact table. In one embodiment, the external data may be imported into the database system 100 from an external data source 105. The external data source 105 may correspond to an online transaction processing system, database objects therein, database statements that directly specify (expressions for) the external data, another database system, computer system, storage device, or computer-readable memory that can provide data to database system 100.

In FIG. 1, a set of source data 110 is received from the external data source 105. The source data 110 may correlate to data copied from a source table 108 (or other relational data structure) residing within the external data source 105. Alternatively and/or optionally, the source data 110 may correlate to data specified directly in a database statement 109 (which may, but is not limited to, come from the external data source 105). The DPM 130 uses source data 110 to help manipulate, query, and aggregate data in internal tables 120, 122, and 124. Accordingly, the DPM 130, at least in part based on the source data 110, performs a series of operations 140 to data in the internal tables 120, 122 and 124. As used herein, the term "operation" refers to an operation of a type such as manipulation, query, aggregation, or a combination of any one or more of the preceding types involving one or more of internal tables in the database system. In one embodiment, each operation, which is based on the source data 110 and acts on one or more of the internal tables 120, 122, and 124, results in data being updated or inserted in one or more of the source data 110 and the one or more corresponding internal tables, or data being aggregated, reported, or stored in various types of data structures, which include, but are not limited to, the internal tables in the database system.

The source data 110 may be in the form of a stream, an array, a sequence, a collection of messages, etc. As will be described with some embodiments of the invention, the source data 110 may stay unchanged, multiply, mutate or otherwise be modified in by one or more operations in the series of operations 140.

According to an embodiment, the series of operations 140 that is partially based on the source data 110 and acts on internal tables in the database system is logically ordered. As used herein, the term "logically ordered" means that a later operation in the series of operation logically depends on the results of an earlier operation in the series that are to be persistently represented in the database. Therefore, in some embodiments, each operation in the series of operations 140 may be expressed in an individual SQL statement, or a database statement that may be allowed by a vendor extension of the SQL standard. As a later operation in the series 140 is logically dependent on the results of an earlier operation, in some embodiments, the results of the earlier operation are not actually (or physically) stored in, or removed from, internal tables or caches of the internal tables in the database system at the time when the later operation accesses the results. For example, the results of the earlier operation may still be stored in a non-database buffer that is allocated by and for the earlier operation, wherein the non-database buffer is used by the earlier operation to carry out (constituent) subtasks in the earlier operation. Consequently, information in such a non-database buffer used by the earlier operation may be directly accessed by the later operation for the purpose of accessing the results of the earlier operation before the results of the earlier operation are actually stored in, or removed from, the internal tables or caches of the internal tables in the database system.

In one embodiment, to facilitate direct accesses of the source data as modified by up to a particular operation by subsequent operations that follow the particular operation, one or more of the earlier operations up to the particular operation in the series mark the source data as ready (for example, using one or more flags that are settable by the earlier operations) to be used by the subsequent operations in the series as soon as the source data is in a state that will be stored or made persistent in, or removed from, in internal tables in the database system by each of the one or more of the earlier operations, before the source data is actually stored or made persistent in, or removed from, the internal tables by the each of the one or more of the earlier operations.

In an embodiment where the source data stream 110 comes from the source table 108, the DPM performs a single scan of the source table 108 in order to perform the series of operations 140 relative to the data in one or more of the internal tables 120, 122 and 124. A scan 112 of the source table 108 may be performed to obtain the source data 110 prior to any of the operations being executed. In other embodiments where the source data 110 is specified directly in a database statement 109 that has been inputted by a user or a program, the DPM performs a single reading of the database statement 109 in order to perform the series of operations 140 relative to the data in one or more of the internal tables 120, 122 and 124. A source input 112 of the data directly specified in the database statement 109 may be performed to obtain the source data 110 prior to any of the operations being executed.

A first operation (in the series), based on some, or all of the, source data 110, is performed on the data of one or more of the internal tables. A second operation (in the series), based on some, or all of the, source data 110 as may or may not be enhanced or modified by the first operation, is performed on the data of, one or more of the internal tables. In performing the second operation, another scan of the source table 108, or another reading of the data specified in the database statement 109, is not performed. A third operation (in the series), based on some, or all of the, source data 110 as may or may not be enhanced or modified by the first operation and the second operation, is performed on the data of, one or more of the internal tables. In performing the third operation, another scan of the source table 108, or another reading of the data specified in the database statement 109, is not performed. In this way, the series of operations 140 is performed using at most a single scan of the source table 108 that yielded the source data 110 in an embodiment. In other embodiments where the source data 110 is directly specified in the database statement 109, the series of operations 140 is performed using at most a one-time conversion (or input) of what has been specified in the statement 109 to the source data 110.

While FIG. 1 illustrates use of a series of operations 140 with tables as source tables, database statements, and internal tables, other embodiments may use other forms of data structures. For example, in one embodiment, instead of the source table 108, the source data 110 may come from a relational data structure such as rows of data that are the result of a query to another table or relational data structure. Thus, the source data 110 may be in the form of a stream of query result from some relational data structure. Also, in an embodiment, the internal tables may be data structures other than relational database tables. In example embodiments, the internal tables may be journal files, audit trails, reports, etc.

Figure 2:
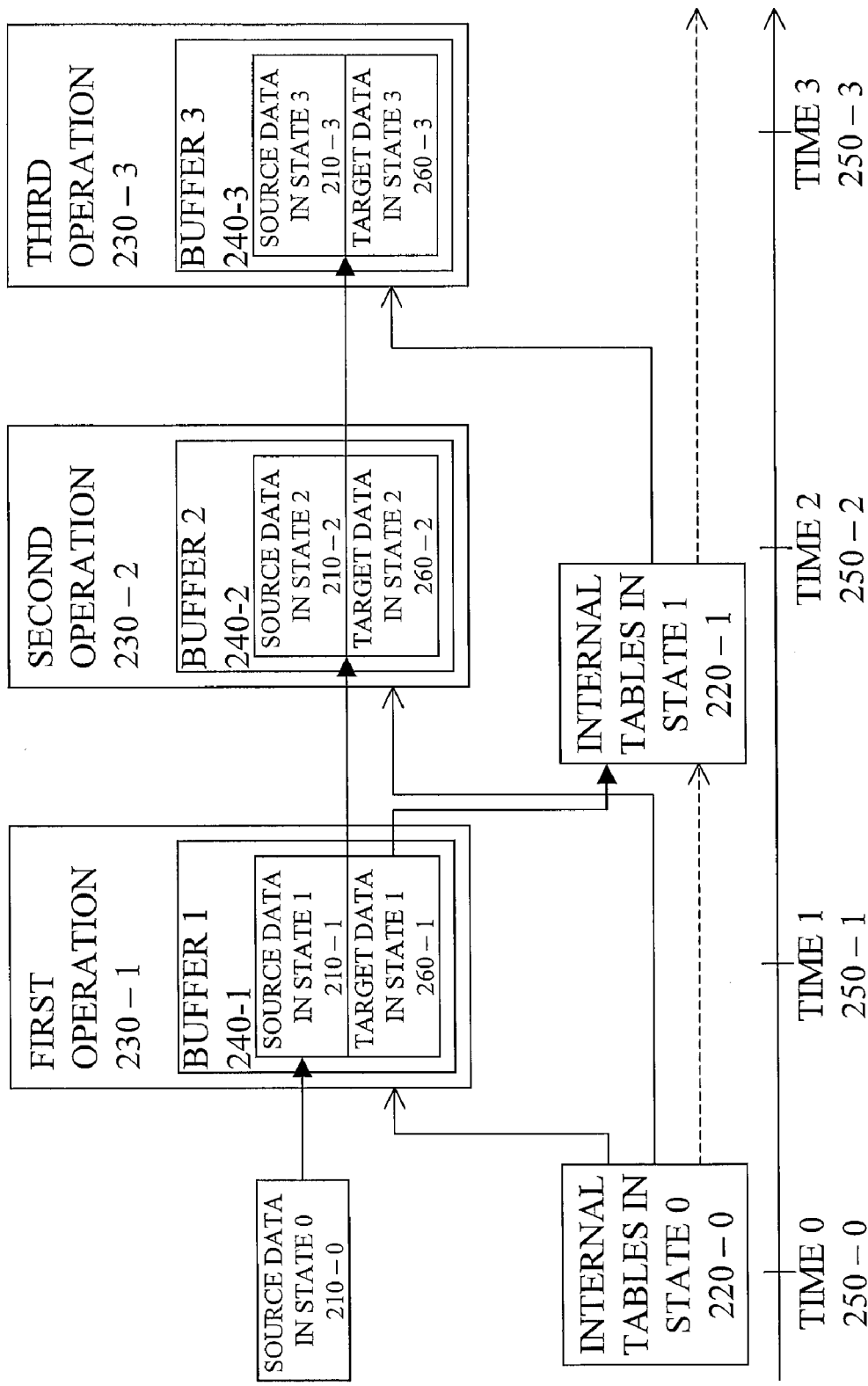
FIG. 2 is a block diagram that illustrates an example series of operations in an example embodiment.

FIG. 2 illustrates a series of operations 140, under an embodiment of the invention. As illustrated, the series of operations 140 comprises three operations: a first operation 230-1, a second operation 230-2, and a third operation 230-3. In FIG. 2, source data 210 in various states is used as a basis to perform each operation in the series of operations 140. By Time 0 (250-0), a source input is performed to yield source data 210 in state 0 (210-0). Once the source input is completed, first operation 230-1 is performed.

The first operation 230-1 may include subtasks that modify internal tables 220. As used herein, the term "modify" refers to a type of action such as an insert, update, delete, merge, or a combination thereof. In an embodiment, the source data 210 generated from the source input can be enhanced along the way before a particular operation 230 by any preceding operations 230 in the series of operations 140.

To carry out its subtasks, an operation in the series of operation 140 may make use of a buffer 240. In a particular embodiment, some, or all of, buffers used by the operations in the series may be in a common memory space shared by the operations in the series. Thus, in that particular embodiment, a side benefit of using the pipelining mechanism as described herein is that memory allocated (therefore memory usage) may be kept to a minimum.

For the purpose of illustration, each operation in the series of operation 140 may make use of a buffer 240. For example, the first operation 230-1 may make use of a buffer 1 (240-1), the second operation 230-2 may make use of a buffer 2 (240-2), and the third operation 230-3 may make use of a buffer 3 (240-3). As illustrated, a part of such a buffer 230 for an operation 230 in the series 140 may store source data 210 in various states. Another part of this buffer 230 may be used to store target data 260 that represents an image of the data in the internal tables 220 at the end of the operation 230.

According to an embodiment, the operation marks the target data 260 as in a ready state as soon as the target data 260 represents the image of the data in the internal tables at the end of the operation 230 before the operation 230 flushes the image of the data into the internal tables 220. Similarly, the operation marks the source data 210 as in a ready state as soon as the source data 210 is in a state at the end of the operation 230 before the operation 230 completes all its subtasks, which may include, but are not limited to, flushing the image in the target data 260 into the internal tables 220.

For example, the first operation 230-1 may initially read into its buffer 240-1 the source data 210 in state 0 (210-0). Depending on the nature of the first operation 230-1, the first operation 230-1 may also read into its buffer 240-1 some data from the internal tables 220 in state 0 (220-0). After one or more subtasks are completed within the first operation 230-1, the first operation 230-1 determines that the target data 260 has reached a ready state (i.e., 260-1). In response to this determination, the first operation 230-1 marks the target data 260-1 as such (i.e., in a ready state), before the image in the target data 260-1 is actually flushed into the internal tables. Similarly, after one or more subtasks are completed within the first operation 230-1, the first operation 230-1 determines that the source data 210 has reached a ready state (i.e., 210-1). In response to this determination, the first operation 230-1 marks the source data 210-1 as such (i.e., in a ready state), before the first operation 230-1 has completed all its subtasks.

For the purpose of illustration, the first operation 230-1 marks both the target data 260-1 and the source data 210-1 as ready (or in a ready state) at time 1 (250-1). At this point, the second operation 230-2 may, without waiting for the first operation 230-1 to complete, read into its buffer 240-2 the source data 210 in state 1 (210-1). Depending on the nature of the second operation 230-2, the second operation 230-2 may read into its buffer 240-2 target data in state 1 (260-1). In some embodiments, the second operation 230-2 may read some other data from the internal tables 220, which currently may be still in state 0 (220-0) since the first operation 230-1 has not yet flushed its target data in state 1 (260-1) to the internal tables 220. For example, the second operation 230-2 may access other data stored in other rows of the internal tables 220 that are different from the rows of the internal tables 220 represented in the buffer 240-1. Thus, in some embodiments, the second operation 230-2 can avoid accessing the internal tables 220 for the rows that are represented in buffer 240-1.

In some embodiments, conflict resolution logic is provided to resolve any conflict between the target data 260 and the data in the internal tables 220, if the second operation 230-2 retrieves overlapping data that comes from both the buffer 240-1 and the internal tables 220. In a particular embodiment, this conflict resolution logic detects the data in the internal tables 220 is stale, for example, using a natural key or a surrogate key that identifies a unique row in a SQL table. Consequently, the data in the target data 260-1 overrides the stale data from the internal tables in state 0 (220-0) in buffer 2 (240-2).

After one or more subtasks are completed within the second operation 230-2, the second operation 230-2 determines that the target data 260 (now in state 2 after the one or more subtasks in the second operation 230-2) has reached a (new, relative to the second operation 230-2) ready state (i.e., 260-2). In response to this determination, the second operation 230-2 marks the target data 260-2 as such (i.e., in a ready state), before the image in the target data 260-2 is actually flushed into the internal tables. Similarly, after one or more subtasks are completed within the second operation 230-2, the second operation 230-2 determines that the source data 210 (now in state 2 after the one or more subtasks in the second operation 230-2) has reached a (new, relative to the second operation 230-2) ready state (i.e., 210-2). In response to this determination, the second operation 230-2 marks the source data 210-2 as such (i.e., in a ready state), before the second operation 230-2 has completed all its subtasks.

According to an embodiment, actually flushing a data image in target data 260 into the internal tables 220 may be performed asynchronously with direct accesses of source data 210 and target data 260 in a buffer 240 of a particular operation 230 by operations 230 that are subsequent to the particular operation 230. For example, flushing the target data 260-1 into the internal tables 220 may occur asynchronously with direct accesses of source data 210-1 and target data 260-1 of the first operation 230-1 by the second operation 230-2 and the third operation 230-3.

For the purpose of illustration, flushing the target data 260-1 into the internal tables 220 occurs between time 1 (250-1) and time 2 (250-2).

Furthermore, for the purpose of illustration, the second operation 230-2 marks both the target data 260-2 and the source data 210-2 as ready (or in a ready state) at time 2 (250-2). At this point, the third operation 230-2 may, without waiting for the second operation 230-2 to complete, read into its buffer 240-3 the source data 210 in state 2 (210-2). Depending on the nature of the third operation 230-3, the third operation 230-3 may read into its buffer 240-3 target data in state 2 (260-2). As described before, in some embodiments, the third operation 230-3 may read some data from the internal tables 220, which currently is in state 1 (220-1) since the first operation 230-1 has flushed its target data in state 1 (260-1) to the internal tables 220. In some embodiments, conflict resolution logic is provided to resolve any conflict between the target data 260 received from another operation 230 and the target data read from the internal tables 220. In a particular embodiment, this conflict resolution logic detects the target data in the internal tables 220 is stale, for example, using a natural key or a surrogate key that identifies a unique row in a SQL table. Consequently, the data in the target data 260-2 overrides the stale data from the internal tables in state 1 (220-1) in buffer 3 (240-3), as the third operation 230-3 reads its input data.

After one or more subtasks are completed within the third operation 230-3, the third operation 230-3 determines that the target data 260 (now in state 3 after the one or more subtasks in the third operation 230-3) has reached a (new, relative to the third operation 230-3) ready state (i.e., 260-3). In response to this determination, the third operation 230-3 marks the target data 260-3 as such (i.e., in a ready state), before the image in the target data 260-3 is actually flushed into the internal tables. Similarly, after one or more subtasks are completed within the third operation 230-3, the third operation 230-3 determines that the source data 210 (now in state 3 after the one or more subtasks in the third operation 230-3) has reached a (new, relative to the third operation 230-3) ready state (i.e., 210-3). In response to this determination, the third operation 230-3 marks the source data 210-3 as such (i.e., in a ready state) at time 3 (250-3), before the third operation 230-3 has completed all its subtasks.

In some embodiments, the steps described above continue until all the operations 230 in the series 140 have been completed. As a result, operations in a series of operations are performed in a pipeline manner. Both source data 210 and target data 260 in a ready state are available for immediate access by subsequent operations in the series before internal database tables 220 in the database system 100 actually reflect the changes as represented by the source data 210 and the target data 260.

In some embodiments, source data 210 in various prior states in prior operations is accessible to (or within the namespace of) subsequent operations, as will be further explained in detail later. In some other embodiments, source data 210 other than referenced by the prior operations may additionally and/or optionally be accessible to (or within the namespace of) subsequent operations, as will be further explained in detail later. Likewise, in some embodiments, data in internal tables 220 in various prior states in prior operations is accessible to (or within the namespace of) subsequent operations, as will be further explained in detail later. In some other embodiments, data in internal tables 220 other than referenced by the prior operations may additionally and/or optionally be accessible to (or within the namespace of) subsequent operations, as will be further explained in detail later.

In the above example, for the sake of simplicity, only three operations 230 in a series of operations 140 are shown, and only source data 210 in various states is shown. However, it should be noted that the concepts taught above may be applied generally to other arrangements. Specifically, for purposes of the present invention, any number of operations can be in the series of operations 140, and any number of data sources that provide source data 210 can participate in a pipelined operations. Additionally and/or optionally, in some embodiments, a part of source data 210 may be read in at a first time by a first operation such as 230-1 in the series, while a different part of source data 210 may be read in at a second time by a second operation such as 230-2 in the series.

Thus far, a buffer 240 in an operation 230 has been described as storing target data 210 that represents an image of the data in the internal tables 220 at the end of the operation 230 that is to be flushed into the internal tables 220 at a certain time. It should be noted that this is for illustrative purposes only. For purposes of the present invention, a buffer 240 may not store an image of the data in the internal tables 220 that is to be flushed into the internal tables 220. For instance, an operation may be a query operation and target data 260 may store an image of the data in the internal tables 220 after the data has been retrieved from the internal tables 220, without any later flushing subtask performed by the query operation. For example, the data retrieved by the query operation may be accessed by operations 230 that are subsequent to the query operation. Furthermore, the data in the buffer 240 may be enhanced by the query operation. However, such enhanced data may only be accessed by the query operation and the subsequent operations, without any flushing subtask performed by the query operation. Thus, these and other variations are within the scope of the present invention.

In some particular embodiments, at least one of the operations in the series 140 as illustrated is a data manipulation operation and at least another of the operations in the same series 140 as illustrated is a query operation.

Insert and Select

All Columns

According to an embodiment, the series of operations 140 may be expressed in a single statement. For example, where a series of operations such as detailed in FIG. 2 comprises an insert operation and a select operation, such a series may be expressed in a single statement S1 as follows:

---

SELECT D.*, S.*     (S1)
  FROM (INSERT INTO T as D SELECT * FROM Src S);
Where D.* contains all columns of an internal table T, and S.* contains all referenced columns of an external table Src.

---

According to an embodiment, values from these columns in the internal table T and/or the external table Src are pipelined values. As used herein, the term "the pipelined values" means that those values are logically the same as those would be stored or made persistent in, or removed from, database objects of the database system, but instead comes from a buffer that the insert operation uses to carry out its subtasks before the pipelined values have been stored or made persistent in the database objects of the database system. In an embodiment, as soon as the data in the buffer is in a state that will be stored in the database system, the insert operation marks the data in the buffer as ready and permits other operations to access the data therein. For example, the pipelined values of the internal table T in the insert operation of S1 may be made available to the select operation of S1 before these values are actually stored in the internal table T in the database system.

As illustrated, the insert operation provides a database view to the select operation. The database view may be provided in a result set that comprises the pipelined values of the columns. In some embodiments, the select operation in statement S1 may optionally comprise a specified predicate in a WHERE clause. As a result, only those rows in the database view, as provided by the insert operation, that match the specified predicate will be returned by the select operation in statement S1.

In an embodiment, columns of the external table Src are not needed, as there is a one-to-one correspondence between the selected columns of the external table Src and the columns of the internal table T. Thus, in that embodiment, columns of the external table Src may not be specified in the select operation of statement S1.

In another embodiment, however, if there are any implicit transformations during the insert operation such as type conversions, selecting Src columns as well as selecting the destination columns in the select operation do make sense. Thus, in that other embodiment, columns of the external table Src may be specified in the select operation of statement S1.

Insert and Select

Selected Columns

According to an embodiment, each operation in a series of operations 140 may specify their respectively references columns. For example, where a series of operations such as detailed in FIG. 2 comprises an insert operation and a select operation, such a series may be expressed in a single statement S2 as follows:

SELECT D.*, S.*  (S2)
FROM (INSERT INTO T as D (k1) SELECT c1 FROM Src S);
Where D.* contains all columns of an internal table T that are included in the result set of the insert operation, and S.* contains all columns of an external table Src that are included in the result set of the insert operation. In some embodiments, since the result set only mentions a column "c1" as from the external table Src, only the column "k1" (which is associated with the column "c1" of the external table Src) of the internal table T and the column "c1" of the external table Src are returned.

Correspondingly, in some embodiments, a statement such as S3 illustrated below is considered as illegal:

SELECT D.k1, D.k2  (S3)
FROM (INSERT INTO T as D (k1) SELECT c1 FROM Src S);
Where D.k2 is a different column from the column "D.k1". Statement S3 is illegal, as it specifies a column, namely "k2", that does not exist in the result set of the insert operation.

However, in some alternative embodiments, all database objects such as SQL tables, views, indexes specified in preceding operations are visible to a later operation that follows the preceding operations. In a particular embodiment, this visibility further applies to sub-units in the database objects. Thus, in that particular embodiment, even if a column such as D.k2 above has not been included in the preceding operations, but if D is specified, then not only D, but also the columns of D (including D.k2), is visible to the select operation in statement S3. In that case, statement S3 will still be considered as legal.

Insert and Select

Single Bow

According to an embodiment, where a series of operations 140 such as detailed in FIG. 2 comprises an insert operation and a select operation, the insert operation may only insert a single row based on data directly specified by a user or a program in a single statement S4, as illustrated below:

SELECT D.*  (S4)
FROM (INSERT INTO T as D as D
  VALUES (val1, val2, val3));
Where the result set only comprises a single row of values val1, val2, and val3. Thus, the select operation returns the row that has been inserted into an internal table T by the insert operation.

Delete and Select

According to an embodiment, where a series of operations such as detailed in FIG. 2 comprises a delete operation and a select operation, such a series may be expressed in a single statement S5 as follows:

SELECT D.*  (S5)
FROM (DELETE FROM T as D WHERE D.k4=v4);
Where D.* contains all columns of an internal table T for rows that are to be deleted in the delete operation.

According to an embodiment, values from these columns in the internal table T are pipelined values. The pipelined values are values in the internal table T that would be removed from the internal table T, but instead comes from a buffer that the delete operation uses to carry out its subtasks (for example, a subtask that determines whether a particular row satisfies the predicate in the WHERE clause above in the delete operation) before the values in the internal table T that correspond to the pipelined values are actually removed from the internal table T of the database system. In an embodiment, as soon as the data in the buffer is in a state that will be stored in the database system, the delete operation marks the data in the buffer as ready and permits other operations to access the data therein. For example, the pipelined values of the internal table T in the delete operation of S5 may be made available to the select operation of S5 before these values are actually removed from the internal table T in the database system.

As illustrated, the delete operation provides a database view to the select operation. The database view may be provided in a result set that comprises the pipelined values of the columns for the rows that will be removed from the internal table T by the delete operation. In some embodiments, the select operation in statement S5 may optionally comprise a specified predicate in a WHERE clause. As a result, only those rows in the database view, as provided by the delete operation, that match the specified predicate will be returned by the select operation in statement S5.

Update and Select

According to an embodiment, where a series of operations such as detailed in FIG. 2 comprises an update operation and a select operation, such a series may be expressed in a single statement S6 as follows:

```
SELECT D.*                                          (S6)
FROM (UPDATE T as D SET D.k1=v1, D.k2=v2, D.k3=v3
    WHERE D.k4=v4);
```
Where D.* contains all columns of an internal table T for rows that are to be updated in the update operation.

According to an embodiment, values from these columns in the internal table T are pipelined values. The pipelined values are values in the internal table T that would be updated (or stored) in the internal table T, but instead comes from a buffer that the update operation uses to carry out its subtasks (for example, a subtask that determines whether a particular row satisfies the predicate in the WHERE clause above in the update operation) before the values in the internal table T that correspond to the pipelined values are actually updated (or stored) in the internal table T of the database system. In an embodiment, as soon as the data in the buffer is in a state that will be stored in the database system, the update operation marks the data in the buffer as ready and permits other operations to access the data therein. For example, the pipelined values of the internal table T in the update operation of S6 may be made available to the select operation of S6 before these values are actually updated (or stored) in the internal table T in the database system.

As illustrated, the update operation provides a database view to the select operation. The database view may be provided in a result set that comprises the pipelined values of the columns for the rows that will be updated (or stored) in the internal table T by the update operation. In some embodiments, the select operation in statement S6 may optionally comprise a specified predicate in a WHERE clause. As a result, only those rows in the database view, as provided by the update operation, that match the specified predicate will be returned by the select operation in statement S6.

In some embodiments, the pipelined values in the columns are new values of the updated rows in the internal table T. In an embodiment, columns of T that are not referenced in the update operation are not allowed to be selected. In some other embodiments, all columns of T are visible for the select operation, even including those that are not referenced in the update operation. In a particular embodiment, a mechanism may be implemented for pipelining both the new and old values of the updated columns. Thus, in that embodiment, both the new and old values of the updated columns may be selected (for example, using keywords such as "NEW" and "OLD" following the specification of a column or a group of columns for the select operation).

Merge and Select

No "WHERE" Clause

According to an embodiment, where a series of operations such as detailed in FIG. 2 comprises a merge operation and a select operation, such a series may be expressed in a single statement S7 as follows:

```
SELECT D.*, S.*                                     (S7)
FROM (MERGE INTO T as D USING Src S ON (D.k4=S.c4)
    WHEN MATCHED THEN
    UPDATE SET D.k1=S.c1, D.k2=S.c2, D.k3=S.c3
    WHEN NOT MATCHED THEN
    INSERT VALUES (S.c1, S.c2, S.c3, S.c4));
```
Where D.* contains all columns of an internal table T for rows that are to be updated or inserted in the merge operation, and S.* contains all referenced columns of an external table Src.

According to an embodiment, values from these columns in the internal table T are pipelined values. The pipelined values are values in the internal table T that would be merged in the internal table T, but instead comes from a buffer that the merge operation uses to carry out its subtasks (for example, a subtask that determines whether a particular row should be inserted or updated in the merge operation) before the values in the internal table T that correspond to the pipelined values are actually merged (or stored) in the internal table T of the database system. In an embodiment, as soon as the data in the buffer is in a state that will be stored in the database system, the merge operation marks the data in the buffer as ready and permits other operations to access the data therein. For example, the pipelined values of the internal table T in the merge operation of S7 may be made available to the select operation of S7 before these values are actually merged (or stored) in the internal table T in the database system.

As illustrated, the merge operation provides a database view to the select operation. The database view may be provided in a result set that comprises the pipelined values of the columns for the rows that will be merged (or stored) in the internal table T by the merge operation. In some embodiments, the select operation in statement S7 may optionally comprise a specified predicate in a WHERE clause. As a result, only those rows in the database view, as provided by the merge operation, that match the specified predicate will be returned by the select operation in statement S7.

In some embodiments, the pipelined values in the columns are new values of the merged rows in the internal table T. In an embodiment, columns of T that are not referenced in the update operation are not allowed to be selected. In some other embodiments, all columns of T are visible for the select operation, even including those that are not referenced in the merge operation. In a particular embodiment, a mechanism may be implemented for pipelining both the new and old values of the merged columns. For example, a user may use "D.k1 (OLD)" to select a pre-merge value of the column "D.k1". Correspondingly, the user may use "D.k1 (NEW)" to select a post-merge value of the column "D.k1". For a row that is inserted by the merge operation, the pre-merge value of the column "D.k1" may return a null. Thus, in that embodiment, both the new and old values of the updated columns may be selected (for example, using keywords such as "NEW" and "OLD" following the specification of a column or a group of columns for the select operation).

Merge and Select

With "WHERE" Clauses

According to an embodiment, where a series of operations such as detailed in FIG. 2 comprises a merge operation and a select operation, the merge operation may comprise a "WHERE" clause, as illustrated in a single statement S8 as follows:

```
SELECT D.*, S.*                                     (S8)
FROM (MERGE INTO T as D
    USING Src S
```

-continued

```
ON (D.col=S.col)
WHEN MATCHED THEN
    UPDATE SET D.k1=S.c1 WHERE S.c2=1
WHEN NOT MATCHED THEN
    INSERT VALUES(S.c1, S.c2) WHERE S.c2=1);
```
Where D.* contains all columns of an internal table T for rows that are to be updated or inserted in the merge operation, and S.* contains all referenced columns of an external table Src. In some embodiments, the result sets from the merge operation includes rows that satisfy the predicates specified in the "WHERE" clauses.

Merge and Select

Merge Contains Delete

In the examples illustrated above, the merge operations comprise only update and insert sub-operations. According to an embodiment, where a series of operations such as detailed in FIG. 2 comprises a merge operation and a select operation, the merge operation may comprise a delete sub-operation, as illustrated in a single statement S9 as follows:

```
SELECT D.*, S.*                                  (S8)
FROM (MERGE INTO T as D
    USING Src S
    ON (D.col=S.col)
    WHEN MATCHED THEN
        UPDATE SET D.k1=S.k1
        DELETE WHERE (D.k1=0)
    WHEN NOT MATCHED THEN
        INSERT VALUES(S.c1, S.c2));
```
Where D.* contains all columns of an internal table T for rows that are to be updated or deleted in the merge operation, and S.* contains all referenced columns of an external table Src. In some embodiments, the columns of the internal table T as specified by "D.*" contain nulls for the rows that are to be deleted from the internal table T.

Example Process Flow

Figure 3:
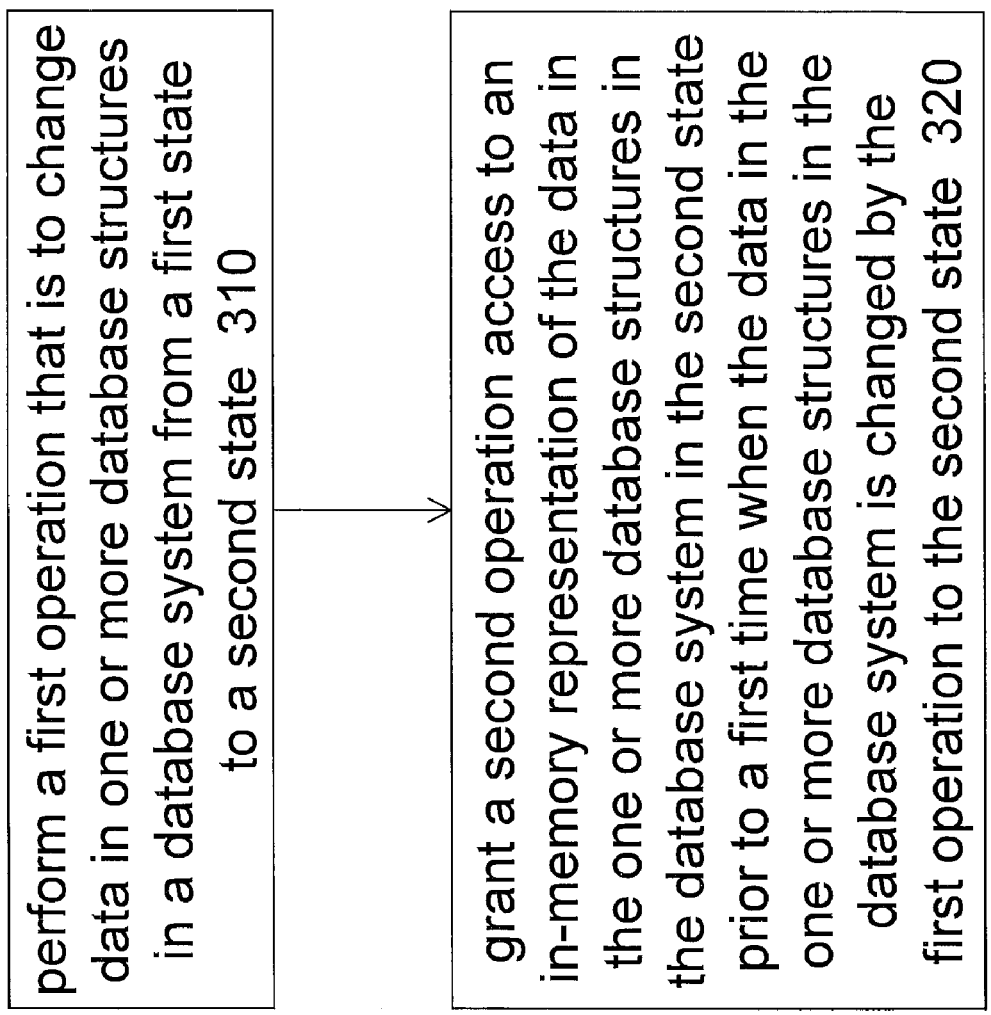
FIG. 3 is a flow diagram that illustrates an example process in accordance with an example embodiment of the present invention.

FIG. 3 is an example flow diagram that illustrates a process for pipelining operations involving one or more DML operations, according to an embodiment of the present invention. In some embodiments, this process that supports DML pipelining may be implemented in a database system such as illustrated in FIG. 1 and FIG. 2. Initially, the database system, or a part thereof such as a plan creator, receives an overall database statement from a user (via a user interface provided by the database system) or from a program that interacts with the database system. The database system 100 determines, based on the overall database statement received, a series of operations. This determination may involve parsing the database statement and access system catalog information, etc. The overall database statement may be any of the database statements such as S1 through S9 as illustrated earlier. Other variations other than S1 through S9 may also be used to define the series of operations. In response to determining that the overall database statement defines a series of operations, a plan creator generates a plan, which, when executed, allows data manipulated by earlier operations in the series of operations to be shared by later operations in the series of operations.

In some embodiments, the plan generated may be executed immediately. In other embodiments, the plan may be executed at a later time. For example, the user may provide an input event that causes the plan to be executed by the database system 100.

In block 310, in executing the plan, the database system performs a first operation that is to change data in one or more database structures in a database system from a first state to a second state. Here, the first operation is a data manipulation operation in a series of operations.

In block 320, the database system grants a second operation access to an in-memory representation of the data in the one or more database structures in the database system in the second state prior to a first time when the data in the one or more database structures in the database system is changed by the first operation to the second state. As used herein, the term "in memory" refers to a memory location that would not be used by the database system, if the second operation were executed as a single database statement with its own execution plan, separately from the execution plan of the first operation. In an example embodiment, the term "in memory" may refer to a memory location where the first operation keeps target data as illustrated in FIG. 2 that is to be flushed into database tables of the database system at the end of the first operation.

In some embodiments, the second operation is a query operation in the series of operations and the second (query) operation logically depends on the data in the one or more database structures in the database system in the second state;

In some embodiments, each of the data structures in the database system is a relational data structure. In some embodiments, each operation in the series of operations has a one-to-one correspondence with each relational database statement in a series of relational database statements. In some embodiments, results of the series of operations can be alternatively obtained by executing the series of relational database statements.

According to an embodiment of the present invention, the in-memory representation of the data in the one or database structures in the database system in the second state forms an in-memory database view. For example, such an in-memory representation may be provided in the form of a row set that constitute a logical database table (i.e., an in-memory database view).

In some embodiments, the series of operations not only contains the first operation as a database manipulation operation, and the second operation as a query operation, but may also contain an aggregation operation as one operation in the series of operations. Furthermore, in various embodiments, the first operation may be one of an insert operation, an update operation, a delete operation, or a merge operation.

In some embodiments, to grant the second operation access to the in-memory representation of the data in the one or more database structures in the database system in the second state prior to the first time when the data in the one or more database structures in the database system is changed by the first operation to the second state, when the first operation is being executed, the database system marks the in-memory representation of the data in the one or more database structures in the database system in the second state as in a ready state prior to the first time when the data in the one or more database structures in the database system is changed by the first operation to the second state, as long as the in-memory representation contains the data in the one or more database structure in the second state as will be at the end or conclusion of the first operation, i.e., in the second state on which the second operation logically depends.

In some embodiments, only data objects referenced by earlier operations in the series are within the namespace of a later operation in the series. In some other embodiments, data objects both referenced and not referenced by earlier operations in the series are all within the namespace of a later operation in the series.

In some embodiments, the series of operations performs a single scan of one or more source tables to obtain source data in an initial state. Here, the source data in the initial state and in zero or more subsequent states is accessible in memory to all operations in the series of operations.

In some other embodiments, the series of operations performs a single input of source data from data directly specified in an overall database statement that defines the series of operations. Here, the source data in various states is accessible in memory to all operations in the series of operations.

Hardware Overview

Figure 4:
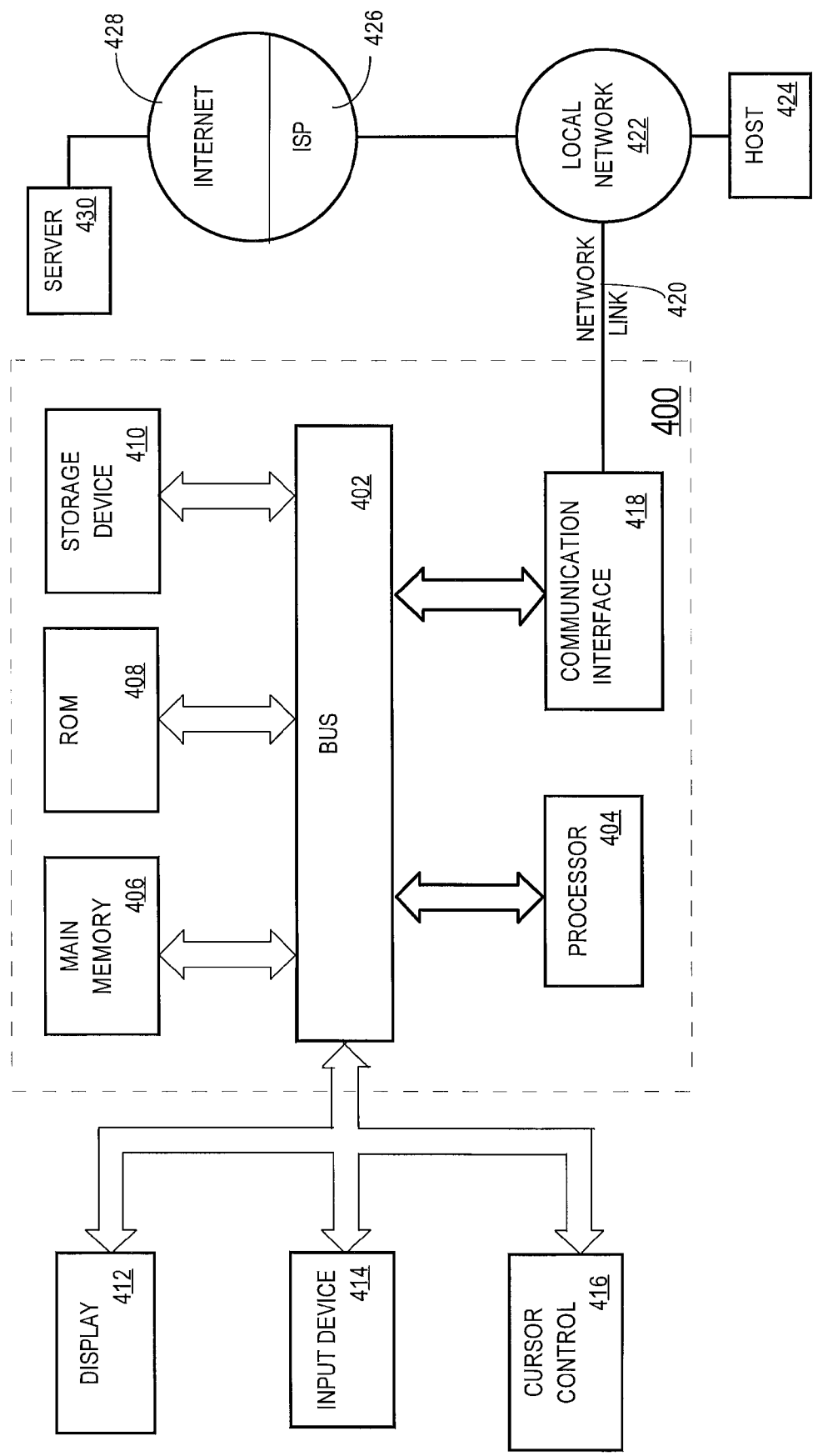
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may be used to implement the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of pipelining operations involving one or more data manipulation operations, the method comprising:

performing a first operation that is to change data in one or more database structures in a database system from a first state to a second state, wherein the first operation is a data manipulation operation in a series of operations; and granting a second operation access to an in-memory representation of the data in the one or more database structures in the database system in the second state prior to a first time when the data in the one or more database structures in the database system is changed by the first operation to the second state, wherein the second operation is a query operation in the series of operations and wherein the second operation logically depends on the data in the one or more database structures in the database system in the second state;

wherein each of the database structures in the database system is a relational data structure;

wherein each operation in the series of operations has a one-to-one correspondence with a relational database statement in a series of relational database statements; and wherein results of the series of operations can be alternatively obtained by executing the series of relational database statements.

2. The method of claim 1, further comprising:
receiving an overall database statement; and
determining, based on the overall database statement, the series of operations; and
generating a plan, when executed, that allows data manipulated by earlier operations in the series of operations to be shared by later operations in the series of operations.

3. The method of claim 1, wherein the in-memory representation of the data in the one or database structures in the database system in the second state forms an in-memory database view.

4. The method of claim 1, wherein at least one operation in the series of operations is an aggregation operation.

5. The method of claim 1, wherein the first operation is one of an insert operation, an update operation, a delete operation, or a merge operation.

6. The method of claim 1, wherein granting the second operation access to the in-memory representation of the data in the one or more database structures in the database system in the second state prior to the first time when the data in the one or more database structures in the database system is changed by the first operation to the second state includes marking the in-memory representation of the data in the one or more database structures in the database system in the second state as in a ready state prior to the first time when the data in the one or more database structures in the database system is changed by the first operation to the second state.

7. The method of claim 1, wherein a later operation in the series of operations may access only data objects that are referenced by prior operations that are earlier than the later operation, wherein the prior operations are part of the series of operations.

8. The method of claim 1, wherein a later operation in the series of operations may access data objects that are not referenced by prior operations that are earlier than the later operation, wherein the prior operations are part of the series of operations.

9. The method of claim 1, wherein the series of operations performs a single scan of one or more source tables to obtain source data in an initial state, wherein the source data in the initial state and in zero or more subsequent states is accessible in memory to all operations in the series of operations.

10. The method of claim 1, wherein the series of operations performs a single input of source data from data directly specified in an overall database statement that defines the series of operations, wherein the source data in various states is accessible in memory to all operations in the series of operations.

11. A computer readable storage medium for storing one or more sequences of instructions, when executed by one or more processors, cause:

performing a first operation that is to change data in one or more database structures in a database system from a first state to a second state, wherein the first operation is a data manipulation operation in a series of operations; and granting a second operation access to an in-memory representation of the data in the one or more database structures in the database system in the second state prior to a first time when the data in the one or more database structures in the database system is changed by the first operation to the second state, wherein the second operation is a query operation in the series of operations and wherein the second operation logically depends on the data in the one or more database structures in the database system in the second state;

wherein each of the database structures in the database system is a relational data structure;

wherein each operation in the series of operations has a one-to-one correspondence with a relational database statement in a series of relational database statements; and wherein results of the series of operations can be alternatively obtained by executing the series of relational database statements.

12. The computer readable storage medium of claim 11, wherein the one or more sequences of instructions further comprise instructions, when executed by the one or more processors, cause:

receiving an overall database statement; and
determining, based on the overall database statement, the series of operations; and
generating a plan, when executed, that allows data manipulated by earlier operations in the series of operations to be shared by later operations in the series of operations.

13. The computer readable storage medium of claim 11, wherein the in-memory representation of the data in the one or database structures in the database system in the second state forms an in-memory database view.

14. The computer readable storage medium of claim 11, wherein at least one operation in the series of operations is an aggregation operation.

15. The computer readable storage medium of claim 11, wherein the first operation is one of an insert operation, an update operation, a delete operation, or a merge operation.

16. The computer readable storage medium of claim 11, wherein granting the second operation access to the in-memory representation of the data in the one or more database structures in the database system in the second state prior to the first time when the data in the one or more database structures in the database system is changed by the first operation to the second state includes marking the in-memory representation of the data in the one or more database structures in the database system in the second state as in a ready state prior to the first time when the data in the one or more database structures in the database system is changed by the first operation to the second state.

17. The computer readable storage medium of claim 11, wherein a later operation in the series of operations may access only data objects that are referenced by prior operations that are earlier than the later operation, wherein the prior operations are part of the series of operations.

18. The computer readable storage medium of claim 11, wherein a later operation in the series of operations may access data objects that are not referenced by prior operations that are earlier than the later operation, wherein the prior operations are part of the series of operations.

19. The computer readable storage medium of claim 11, wherein the series of operations performs a single scan of one or more source tables to obtain source data in an initial state, wherein the source data in the initial state and in zero or more subsequent states is accessible in memory to all operations in the series of operations.

20. The computer readable storage medium of claim 11, wherein the series of operations performs a single input of source data from data directly specified in an overall database statement that defines the series of operations, wherein the source data in various states is accessible in memory to all operations in the series of operations.

* * * * *

UNITED STATES PATENT AND TRADEMARK OFFICE
CERTIFICATE OF CORRECTION

| | | |
|---|---|---|
| PATENT NO. | : 7,991,794 B2 | Page 1 of 1 |
| APPLICATION NO. | : 12/190413 | |
| DATED | : August 2, 2011 | |
| INVENTOR(S) | : Bedi et al. | |

It is certified that error appears in the above-identified patent and that said Letters Patent is hereby corrected as shown below:

Title Page, Item (57) under "Abstract", line 2, delete "manipulation" and insert -- Manipulation --.

In column 14, line 36, delete "database" and insert -- more database --, therefor.

In column 17, line 64, in Claim 3, delete "database" and insert -- more database --, therefor.

In column 18, line 66, in Claim 13, delete "database" and insert -- more database --, therefor.

Signed and Sealed this
Twenty-ninth Day of November, 2011

David J. Kappos
*Director of the United States Patent and Trademark Office*